Feb. 5, 1929.
R. GARCIA
1,701,407
AIRCRAFT
Filed Dec. 21, 1927
3 Sheets-Sheet 1
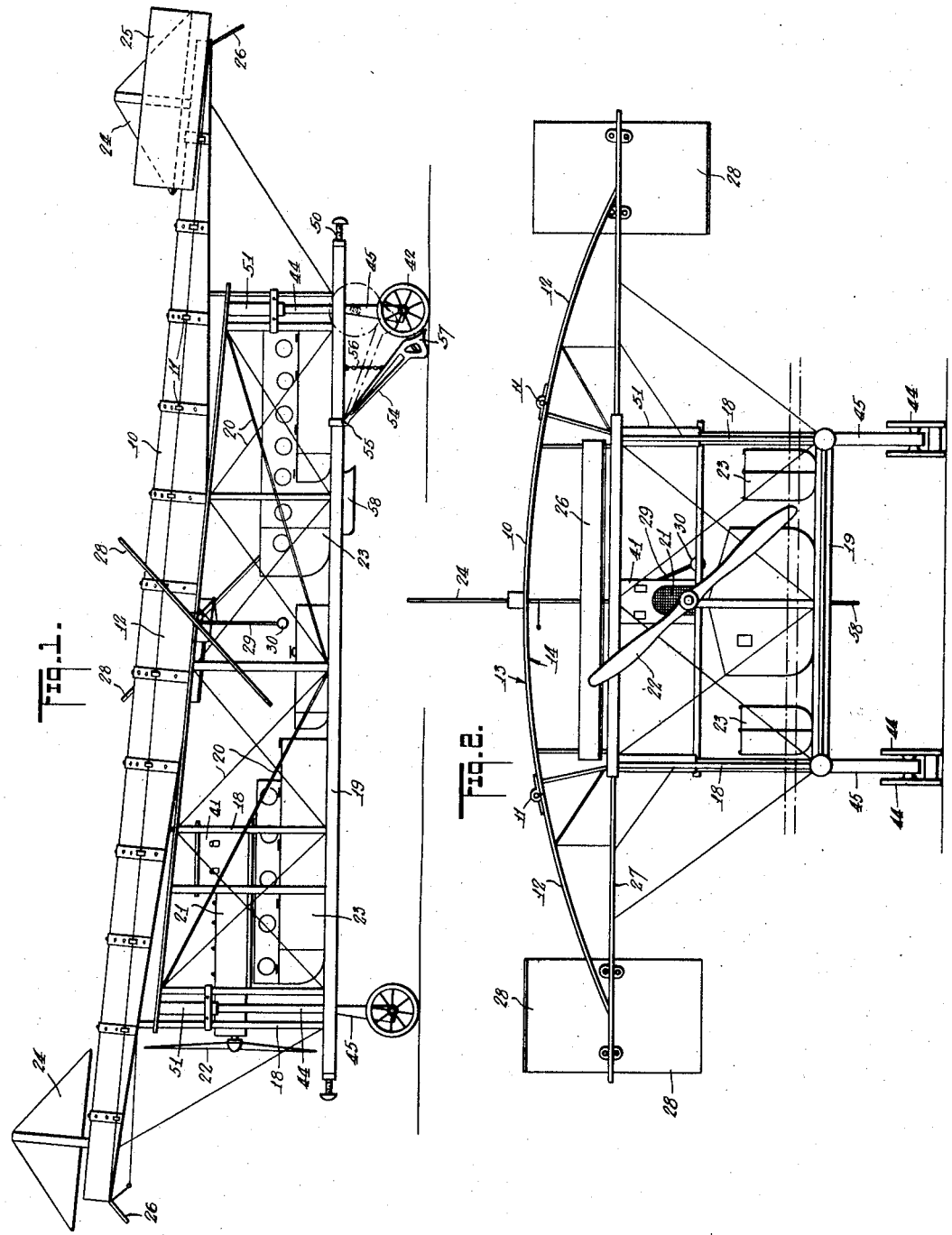
INVENTOR
Rogelio Garcia
BY
ATTORNEY

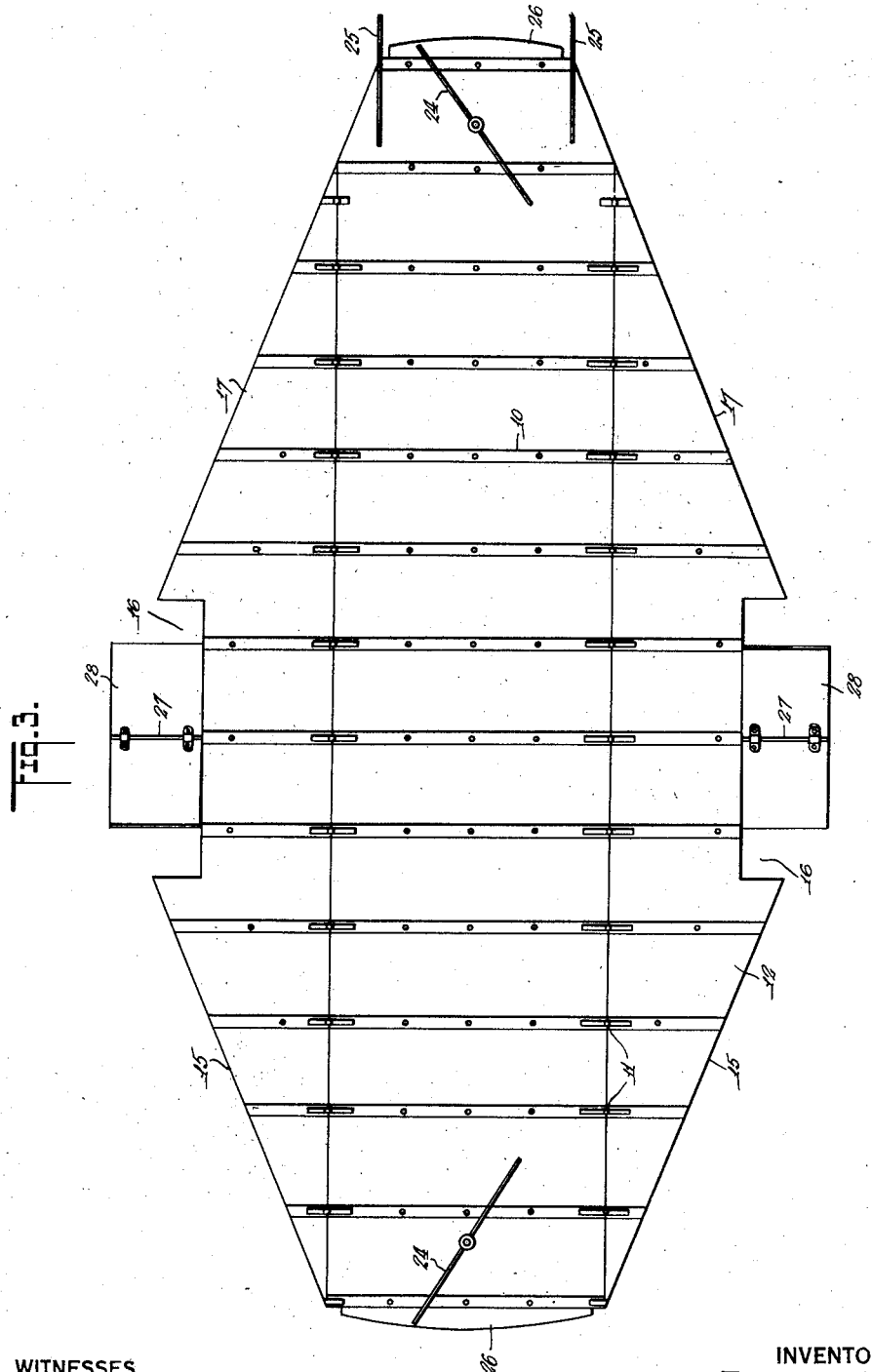

Feb. 5, 1929.
R. GARCIA
AIRCRAFT
Filed Dec. 21, 1927  3 Sheets-Sheet 3
1,701,407
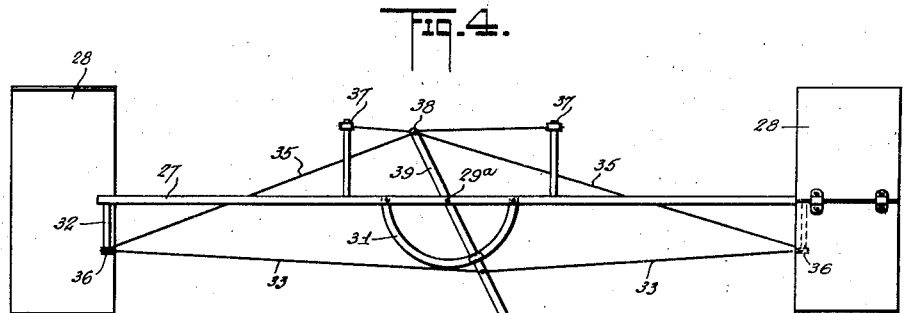
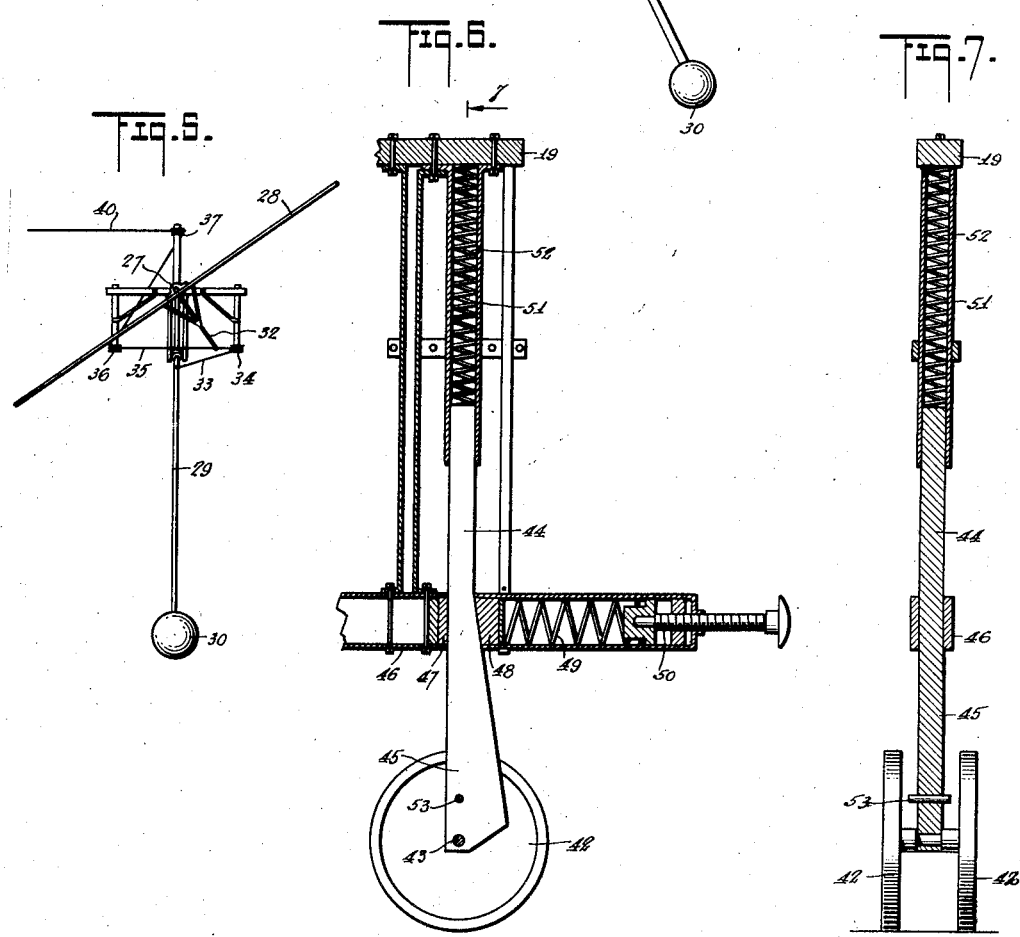
WITNESSES
INVENTOR
Rogelio Garcia
BY
ATTORNEY Patented Feb. 5, 1929.

1,701,407

UNITED STATES PATENT OFFICE.

ROGELIO GARCIA, OF NEW YORK, N. Y.

AIRCRAFT.

Application filed December 21, 1927. Serial No. 241,639.

This invention relates to aircraft and has particular reference to aircraft of the heavier-than-air type, such as aeroplanes or hydro-aeroplanes.

One of the principal objects of the present invention resides in the provision of an improved shock absorbing means for use in connection with aircraft which lands by vertical descent, said means serving to relieve the craft of undue shock and vibration, particularly when the same is landed in an emergency.

The invention further aims to provide a combined brake and tail skid.

Other objects reside in the comparative simplicity of construction, the economy with which the machine may be constructed and the general efficiency derived therefrom.

With the above noted and other objects in view, reference is had to the following description and accompanying drawings in which there is exhibited one example or embodiment of the invention, while the appended claims define the actual scope of the invention.

In the drawings—

Figure 1 is a side view of the machine illustrating respectively in full and dotted lines, the normal position and the depressed position of the rear supporting wheels and the combined tail skid and brake;

Fig. 2 is a front view of the machine;

Fig. 3 is a top plan view thereof;

Fig. 4 is a diagrammatic front view of the automatic aileron control;

Fig. 5 is a side view thereof;

Fig. 6 is a fragmentary sectional view of the shock absorbing mounting for the wheels;

Fig. 7 is a sectional view therethrough taken approximately on the line 7—7 of Fig. 6.

Referring to the drawings by characters of reference, 10 designates the main or central section of the airfoil to which is attached at its opposite side edges by hinges 11, foldable side sections 12. The main section together with the side sections 12 are of arcuate configuration in transverse cross section, presenting an upper convex surface 13 and a lower concave surface 14. The side sections 12 have their outer forward side edges 15 converging forwardly from the central cutaway portion 16 and have their rear side edges 17 converging rearwardly from the cut-away portions 16. The airfoil is disposed at a forward and upward inclination and has attached thereto and depending therefrom vertical elements 18, which are in turn connected with horizontal elements 19 of a framework which is suitably braced by guy wires or ropes 20 in any approved manner. The framework also supports the motor 21 which is provided with the usual propeller 22. Suitably attached and supported within the framework are pontoons 23 affording cabins and compartments for the crew, passengers or freight. At the front and rear ends and supported above the main airfoil section 10, are air rudders 24 for turning the machine. At the rear end and projecting upwardly from the main airfoil section 10, are laterally spaced fins 25, while at the front and rear ends of the main airfoil section 10, are the elevators 26.

Supported on a suitably braced transverse supporting arm 27 are a pair of ailerons 28 which are partially disposed within the cutaway portions 16. The ailerons are turnable with respect to the arm 27 and are automatically controlled by a laterally swingable pendulum which consists of an arm 29 fulcrumed at 29ª and provided with a weight 30 at its lower end. The arm 29 is guided in its movement by spaced sectors 31. Each aileron 28 is provided with an angularly projecting leg 32 which is connected to the arm 29 by a cable 33 trained around a guide 34. In order that the arm 29 may be swung in an opposite direction or counterbalanced by the pendulum, a cable 35 trained around a guide 36 and a vertical spaced guide 37, is connected at 38 to the upwardly extending extremity 39 of the pendulum arm 29. From this arrangement it will be seen that the pendulum while automatically controlling the ailerons, is capable of being manually controlled by a cable 40 leading to the pilot compartment 41 directly in rear of the motor.

The landing gear includes front and rear sets of wheels 42, the axles 43 of which are journaled in bearings in the lower ends of standards 44. The lower portions 45 of the standards 44 are of gradually increasing widths downwardly to present a wedge shape which extends through a frame 46 having a stationary resilient block 47 and a movable resilient wedge block 48. The wedge block 48 in addition to its own resiliency, is tensioned against movement by a spring 49, the tension of which is adjustable by a suitable adjusting means 50. The upper end of the standard 44 is telescopically associated with a depending guide 51 which is connected to and depends from the horizontal frame 19. A coiled expansion spring 52 is arranged in the guide 51 and is interposed between the upper end of the standard 44 and the frame 19. Under this construction and arrangement, it is obvious that when the wheels 42 contact with the ground, the shock is partially absorbed by the springs 52, while the friction of the wedge block 48 serves together with its spring 49, to further assist in absorbing the shock. The relative downward movement of the machine with respect to the standards 44 and the wheels is limited by a transverse pin 53 which is designed to contact with the frame 46.

A combined tail skid and brake 54 is fulcrumed at 55 on the frame in front of the rear sets of wheels and said tail skid is limited against downward swinging movement by a flexible element 56, such as a chain. The free rear end of the tail skid 54 is shaped to form a wheel engaging shoe 57.

In operation, the tail skid swings relatively upward with respect to the frame 19 as the wheels move upwardly to the dotted-line position in Fig. 1. This brings the shoe portion 57 into engagement with the periphery or tread of the wheels so that the tail skid acts in its capacity as a tail skid for gradually arresting the forward motion of the machine after the landing operation. When the machine is landed in the water, the pontoons 23 are designed to support the same and a water rudder 58 is employed for steering the machine.

What is claimed is:

1. In a landing gear for an aeroplane of the character described, supporting wheels tensioned against vertical movement with respect to the machine, and a combined brake and tail skid fulcrumed to the machine in advance of said wheels having a wheel engaging shoe at the terminal thereof operable to engage the tread of the wheels when the same move upwardly relative to the machine upon landing.

2. A landing gear for aircraft of the character described including supporting wheels and vertical standards in which the wheels are journaled at the lower end, said standards having wedge shaped portions and yieldable wedge shaped means coacting with said wedge shaped portions.

3. A landing gear for aircraft of the character described including supporting wheels and vertical standards in which the wheels are journaled at the lower end, said standards having wedge shaped portions and yieldable wedge shaped means coacting with said wedge shaped portions, said wedge shaped means including adjustable tension devices.

4. A landing gear for aircraft of the character described comprising depending guides from the aircraft, standards depending from said guides and tensioned against upward movement, landing wheels journaled in the lower ends of the standards, wedge shaped portions on said standards and yieldable wedge means coacting with the wedge shaped portions.

5. A landing gear for aircraft of the character described comprising depending guides from the aircraft, standards depending from said guides and tensioned against upward movement, landing wheels journaled in the lower ends of the standards, wedge shaped portions on said standards and yieldable wedge means coacting with the wedge shaped portions, said wedge means including adjustable tension devices as and for the purpose specified.

Signed at New York in the county of New York and State of New York this 19th day of December A. D. 1927.

ROGELIO GARCIA.